United States Patent
Kadri

(10) Patent No.: US 10,873,820 B2
(45) Date of Patent: Dec. 22, 2020

(54) CONDITIONAL CONTENT ENHANCEMENT

(71) Applicant: Sonos, Inc., Santa Barbara, CA (US)

(72) Inventor: Romi Kadri, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/696,316

(22) Filed: Nov. 26, 2019

(65) Prior Publication Data

US 2020/0100041 A1 Mar. 26, 2020

Related U.S. Application Data

(63) Continuation of application No. 15/973,443, filed on May 7, 2018, now Pat. No. 10,524,070, which is a
(Continued)

(51) Int. Cl.
*H04R 29/00* (2006.01)
*G06F 3/16* (2006.01)
*H04R 27/00* (2006.01)

(52) U.S. Cl.
CPC .......... *H04R 29/007* (2013.01); *G06F 3/165* (2013.01); *H04R 27/00* (2013.01);
(Continued)

(58) Field of Classification Search
CPC .............. H04R 2420/07; H04R 27/00; H04R 2227/005; H04R 29/007; H04R 2227/003;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
EP 2548379 A1 1/2013
(Continued)

OTHER PUBLICATIONS

Advisory Action dated Apr. 30, 2018, issued in connection with U.S. Appl. No. 14/971,796, filed Dec. 16, 2015, 2 pages.
(Continued)

*Primary Examiner* — Norman Yu

(57) ABSTRACT

An example computer system identifies a capability of a playback device to reproduce audio content. Based on the capability, the computer system identifies a first version of audio content for playback by the playback device and causes the playback device to play back the first version of audio content. While the playback device is playing back the first version of the audio content, the computer system detects a change in a network connection between the computer system and the playback device. Based on the detected change in the network connection and the capability of the playback device, the computer system identifies a second version of audio content for playback by the playback device and causes the playback device to transition from playing back the first version of the audio content to playing back the second version of the audio content.

20 Claims, 7 Drawing Sheets

Related U.S. Application Data continuation of application No. 15/280,979, filed on Sep. 29, 2016, now Pat. No. 9,967,689.

(52) U.S. Cl.
CPC .. *H04R 2227/003* (2013.01); *H04R 2227/005* (2013.01); *H04R 2430/01* (2013.01)

(58) Field of Classification Search
CPC .......... H04R 2430/01; H04L 29/06027; H04L 65/60; G06F 3/165; H03G 3/00; H03G 1/02; H03G 3/20; H03G 7/00; H04M 1/72558; H04S 3/00; H04S 7/00
USPC ....... 381/81, 85, 107, 123, 56, 58, 119, 300, 381/303, 59, 61, 80; 455/450, 464; 379/101.01
See application file for complete search history.

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,108,686 A | 8/2000 | Williams, Jr. |
| 6,256,554 B1 | 7/2001 | Dilorenzo |
| 6,349,339 B1 | 2/2002 | Williams |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,757,517 B2 | 6/2004 | Chang et al. |
| 6,778,869 B2 | 8/2004 | Champion |
| 6,826,283 B1 | 11/2004 | Wheeler et al. |
| 6,985,694 B1 | 1/2006 | De Bonet et al. |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang et al. |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 7,941,761 B2 | 5/2011 | Hally et al. |
| 7,987,294 B2 | 7/2011 | Bryce et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,103,009 B2 | 1/2012 | McCarty et al. |
| 8,214,873 B2 | 7/2012 | Weel |
| 8,230,099 B2 | 7/2012 | Weel |
| 8,234,395 B2 | 7/2012 | Millington |
| 8,396,800 B1 | 3/2013 | Wieder |
| 8,483,853 B1 | 7/2013 | Lambourne |
| 8,788,514 B1 | 7/2014 | Ramanarayanan et al. |
| 8,942,252 B2 | 1/2015 | Balassanian et al. |
| 9,344,755 B2 | 5/2016 | Vega et al. |
| 9,489,383 B2 | 11/2016 | Hyman et al. |
| 9,529,979 B2 | 12/2016 | Torgerson et al. |
| 9,547,647 B2 | 1/2017 | Badaskar et al. |
| 9,667,679 B2 | 5/2017 | Lang et al. |
| 9,674,587 B2 | 6/2017 | Triplett et al. |
| 9,699,522 B2 | 7/2017 | Kim et al. |
| 9,967,615 B2 | 5/2018 | Coburn, IV et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2002/0154691 A1 | 10/2002 | Kost et al. |
| 2003/0001016 A1 | 1/2003 | Fraier et al. |
| 2003/0157951 A1 | 8/2003 | Hasty |
| 2004/0024478 A1 | 2/2004 | Hans et al. |
| 2004/0072584 A1 | 4/2004 | Kern |
| 2004/0088328 A1 | 5/2004 | Cook et al. |
| 2004/0143603 A1 | 7/2004 | Kaufmann et al. |
| 2005/0256722 A1 | 11/2005 | Clark et al. |
| 2006/0047704 A1 | 3/2006 | Gopalakrishnan |
| 2006/0095401 A1 | 5/2006 | Krikorian et al. |
| 2006/0143236 A1 | 6/2006 | Wu |
| 2006/0149850 A1 | 7/2006 | Bowman |
| 2006/0200545 A1 | 9/2006 | Fromentoux et al. |
| 2006/0253436 A1 | 11/2006 | Cook et al. |
| 2007/0088747 A1 | 4/2007 | Cheng et al. |
| 2007/0100966 A1* | 5/2007 | Peng .................. H04L 67/02 709/219 |
| 2007/0107019 A1 | 5/2007 | Romano et al. |
| 2007/0142944 A1 | 6/2007 | Goldberg et al. |
| 2007/0294131 A1 | 12/2007 | Roman et al. |
| 2008/0052371 A1 | 2/2008 | Partovi et al. |
| 2008/0056675 A1 | 3/2008 | Wright et al. |
| 2008/0104268 A1 | 5/2008 | Farber et al. |
| 2008/0189293 A1 | 8/2008 | Strandel et al. |
| 2008/0205856 A1 | 8/2008 | Kim et al. |
| 2009/0100147 A1 | 4/2009 | Igarashi |
| 2009/0136210 A1 | 5/2009 | Morimoto |
| 2009/0150491 A1 | 6/2009 | Yamamoto |
| 2009/0180534 A1 | 7/2009 | Hluchyj et al. |
| 2009/0204842 A1 | 8/2009 | Tetik et al. |
| 2009/0222514 A1 | 9/2009 | Igarashi |
| 2009/0307062 A1 | 12/2009 | Lutnick et al. |
| 2010/0017366 A1 | 1/2010 | Robertson et al. |
| 2010/0075313 A1 | 3/2010 | Kreuwel et al. |
| 2010/0095332 A1 | 4/2010 | Gran et al. |
| 2010/0128176 A1 | 5/2010 | Nakajima et al. |
| 2010/0205222 A1 | 8/2010 | Gajdos et al. |
| 2010/0262909 A1 | 10/2010 | Hsieh |
| 2010/0281108 A1 | 11/2010 | Cohen |
| 2011/0004468 A1 | 1/2011 | Fusakawa et al. |
| 2011/0246623 A1 | 10/2011 | Pantos et al. |
| 2012/0071996 A1 | 3/2012 | Svendsen |
| 2012/0117183 A1 | 5/2012 | Wong et al. |
| 2012/0210225 A1 | 8/2012 | McCoy et al. |
| 2012/0210353 A1 | 8/2012 | Wong et al. |
| 2013/0070860 A1 | 3/2013 | Schramm et al. |
| 2013/0198298 A1 | 8/2013 | Li et al. |
| 2013/0263193 A1 | 10/2013 | Hirano et al. |
| 2013/0268980 A1 | 10/2013 | Russell |
| 2013/0343567 A1 | 12/2013 | Triplett et al. |
| 2014/0010515 A1 | 1/2014 | Lee et al. |
| 2014/0189648 A1 | 7/2014 | Everitt |
| 2014/0323036 A1 | 10/2014 | Daley et al. |
| 2015/0025661 A1 | 1/2015 | Vega-Zayas et al. |
| 2015/0036695 A1 | 2/2015 | Gowda et al. |
| 2015/0067016 A1 | 3/2015 | Park et al. |
| 2015/0150146 A1 | 5/2015 | Torgerson et al. |
| 2015/0172756 A1 | 6/2015 | Coburn, IV et al. |
| 2015/0179227 A1 | 6/2015 | Russell |
| 2015/0234820 A1 | 8/2015 | Aravamudan et al. |
| 2015/0293917 A1 | 10/2015 | Bufe, III et al. |
| 2016/0078903 A1 | 3/2016 | Chitnis et al. |
| 2016/0080739 A1 | 3/2016 | Perlman et al. |

(56) References Cited

U.S. PATENT DOCUMENTS

| | | | |
|---|---|---|---|
| 2016/0088037 A1 | 3/2016 | Lang | |
| 2016/0088339 A1 | 3/2016 | Nakanishi | |
| 2016/0100031 A1 | 4/2016 | Wood et al. | |
| 2016/0150344 A1* | 5/2016 | Filev ........................ | H04S 7/30 455/414.2 |
| 2016/0269128 A1 | 9/2016 | Gautama et al. | |
| 2017/0026686 A1 | 1/2017 | Glazier et al. | |
| 2017/0093943 A1 | 3/2017 | Alsina et al. | |
| 2017/0171577 A1 | 6/2017 | Kipp | |
| 2017/0251040 A1 | 8/2017 | Archambault et al. | |
| 2020/0117416 A1 | 4/2020 | Vega Zayas et al. | |

FOREIGN PATENT DOCUMENTS

| | | |
|---|---|---|
| JP | 2008500614 A | 1/2008 |
| JP | 2009141746 A | 6/2009 |
| KR | 100890993 | 3/2009 |
| WO | 200153994 | 7/2001 |
| WO | 2003093950 A2 | 11/2003 |
| WO | 2005119948 A2 | 12/2005 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Chinese Office Action dated May 5, 2016, issued in connection with Chinese Patent Application No. 201280056773.0, 18 pages.
Chinese Patent Office, Second Office Action dated Jan. 20, 2017, issued in connection with Chinese Application No. 201280056773.0, 15 pages.
Chinese Patent Office, Third Office Action dated Sep. 26, 2017, issued in connection with Chinese Application No. 201280056773.0, 4 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated Jan. 26, 2016, issued in connection with European Application No. 12833511.4, 6 pages.
European Patent Office, European Extended Search Report dated Mar. 8, 2018, issued in connection with EP Application No. 17198086.5, 5 pages.
European Patent Office, European Office Action dated Jul. 30, 2019, issued in connection with European Application No. 16828813.2, 9 pages.
European Patent Office, Office Action dated Sep. 29, 2016, issued in connection with European Application No. 12833511.4, 6 pages.
Final Office Action dated Jun. 12, 2015, issued in connection with U.S. Appl. No. 13/239,077, filed Sep. 21, 2011, 21 pages.
Final Office Action dated Jul. 12, 2018, issued in connection with U.S. Appl. No. 14/990,283, filed Jan. 7, 2016, 14 pages.
Final Office Action dated Jul. 15, 2019, issued in connection with U.S. Appl. No. 15/973,443, filed May 7, 2018, 26 pages.
Final Office Action dated Jan. 18, 2018, issued in connection with U.S. Appl. No. 14/971,796, filed Dec. 16, 2015, 17 pages.
Final Office Action dated Jun. 29, 2018, issued in connection with U.S. Appl. No. 14/990,283, filed Jan. 7, 2016, 11 pages.
First Action Interview Office Action dated Mar. 7, 2019, issued in connection with U.S. Appl. No. 15/973,443, filed May 7, 2018, 4 pages.

International Bureau, International Preliminary Report on Patentability dated Apr. 3, 2014, issued in connection with International Application No. PCT/US2012/056467, filed Sep. 21, 2011, 11 pages.
International Bureau, International Preliminary Report on Patentability, dated Jun. 28, 2018, issued in connection with International Application No. PCT/US2016/065640, filed Dec. 16, 2015, 12 pages.
International Searching Authority, International Search Report and Written Opinion dated Feb. 24, 2017, issued in connection with International Application No. PCT/US2016/065640, filed Dec. 8, 2016, 15 pages.
International Searhing Authority, International Search Report and Written Opinion dated Feb. 28, 2013, issued in connection with International Application No. PCT/US2012/056467, filed Sep. 21, 2012, 12 pages.
Japanese Patent Office, Final Office Action dated Mar. 8, 2016, issued in connection with Japanese Patent Application No. JP2014-531990, 10 pages.
Japanese Patent Office, Final Office Action dated Aug. 16, 2016, issued in connection with Japanese Patent Application No. 2014-531990, 6 pages.
Japanese Patent Office, Office Action dated Jun. 13, 2017, issued in connection with Japanese patent application No. 2016-113766, 7 pages.
Japanese Patent Office, Translation of Office Action dated Jun. 13, 2017, issued in connection with Japanese Patent Application No. 2016-113766, 3 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 21, 2014, issued in connection with U.S. Appl. No. 13/239,077, filed Sep. 21, 2011, 18 pages.
Non-Final Office Action dated Apr. 25, 2013, issued in connection with U.S. Appl. No. 13/239,077, filed Sep. 21, 2011, 21 pages.
Non-Final Office Action dated Dec. 1, 2017, issued in connection with U.S. Appl. No. 14/990,235, filed Jan. 7, 2016, 18 pages.
Non-Final Office Action dated Aug. 10, 2017, issued in connection with U.S. Appl. No. 14/971,796, filed Dec. 16, 2015, 17 pages.
Non-Final Office Action dated Dec. 6, 2017, issued in connection with U.S. Appl. No. 14/990,283, filed Jan. 7, 2016, 20 pages.
Non-Final Office Action dated Jan. 9, 2020, issued in connection with U.S. Appl. No. 16/142,689, filed Sep. 26, 2018, 9 pages.
Notice of Allowance dated Oct. 7, 2019, issued in connection with U.S. Appl. No. 16/154,685, filed Oct. 8, 2018, 10 pages.
Notice of Allowance dated Dec. 9, 2015, issued in connection with U.S. Appl. No. 13/239,077, filed Sep. 21, 2011, 9 pages.
Notice of Allowance dated Jan. 9, 2018, issued in connection with U.S. Appl. No. 15/280,979, filed Sep. 29, 2016, 14 pages.
Notice of Allowance dated Oct. 9, 2019, issued in connection with U.S. Appl. No. 15/973,443, filed May 7, 2018, 5 pages.
Notice of Allowance dated Sep. 19, 2018, issued in connection with U.S. Appl. No. 14/990,235, filed Jan. 7, 2016, 10 pages.
Notice of Allowance dated Oct. 25, 2018, issued in connection with U.S. Appl. No. 14/990,283, filed Jan. 7, 2016, 10 pages.
Notice of Allowance dated Jul. 26, 2018, issued in connection with U.S. Appl. No. 14/971,796, filed Dec. 16, 2015, 15 pages.
Palm, Inc., "Handbook for the Palm VII Handheld," May 2000, 311 pages.
Pre-Brief Appeal Conference Decision dated Sep. 14, 2018, issued in connection with U.S. Appl. No. 14/990,235, filed Jan. 7, 2016, 2 pages.
Preinterview First Office Action dated Aug. 29, 2017, issued in connection with U.S. Appl. No. 15/280,979, filed Sep. 29, 2016, 6 pages.

(56) References Cited

OTHER PUBLICATIONS

Preinterview First Office Action dated Nov. 5, 2018, issued in connection with U.S. Appl. No. 15/973,443, filed May 7, 2018, 5 pages.
Presentations at WinHEC 2000, May 2000, 138 pages.
United States Patent and Trademark Office, U.S. Appl. No. 14/971,796 filed Dec. 16, 2015, entitled "Synchronization of Content Between Networked Devices", 68 pages.
United States Patent and Trademark Office, U.S. Appl. No. 60/490,768 filed Jul. 28, 2003, entitled "Method for synchronizing audio playback between multiple networked devices," 13 pages.
United States Patent and Trademark Office, U.S. Appl. No. 60/825,407 filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, Summons to Attend Oral Proceedings dated May 12, 2020, issued in connection with European Application No. 16828813.2, 8 pages.
Notice of Allowance dated Sep. 16, 2020, issued in connection with U.S. Appl. No. 16/798,936, filed Feb. 24, 2020, 19 pages.
Notice of Allowance dated Apr. 22, 2020, issued in connection with U.S. Appl. No. 16/142,689, filed Sep. 26, 2018, 8 pages.
Yamaha DME Designer 3.0 Owner's Manual; Copyright 2008, 501 pages.

\* cited by examiner

| First Version of Audio Content | | ← 601 |
|---|---|---|
| Audio Characteristic | First Value | |
| Bit Depth (701a) | 8 bit (702a) | |
| Sample Rate (701b) | 32 kHz (702b) | |
| # of Channels (701c) | 1 (mono) (702c) | |
| . | . | |
| . | . | |
| . | . | |

| Playback Device | | ← 108 |
|---|---|---|
| Audio Characteristic | Capability | |
| Bit Depth (701a) | 16 bit (703a) | |
| Sample Rate (701b) | 44.1 kHz (703b) | |
| # of Channels (701c) | 1 (mono) (703c) | |
| . | . | |
| . | . | |
| . | . | |

| Second Version of Audio Content | | ← 602 |
|---|---|---|
| Audio Characteristic | Second Value | |
| Bit Depth (701a) | 16 bit (704a) | |
| Sample Rate (701b) | 32 kHz (704b) | |
| # of Channels (701c) | 1 (mono) (704c) | |
| . | . | |
| . | . | |
| . | . | |

FIG. 7

| First Version of Audio Content ← 801 | |
|---|---|
| Audio Characteristic | First Value |
| Bit Depth (701a) | 16 bit (802a) |
| Sample Rate (701b) | 44.1 kHz (802b) |
| # of Channels (701c) | 1 (mono) (802c) |
| . . . | . . . |

| Playback Device (grouped with 106) ← 108 | |
|---|---|
| Audio Characteristic | Capability |
| Bit Depth (701a) | 16 bit (803a) |
| Sample Rate (701b) | 44.1 kHz (803b) |
| # of Channels (701c) | 2 (stereo) (803c) |
| . . . | . . . |

| Second Version of Audio Content ← 804 | |
|---|---|
| Audio Characteristic | Second Value |
| Bit Depth (701a) | 16 bit (805a) |
| Sample Rate (701b) | 32 kHz (805b) |
| # of Channels (701c) | 2 (stereo) (805c) |
| . . . | . . . |

FIG. 8

CONDITIONAL CONTENT ENHANCEMENT

CROSS REFERENCE TO RELATED APPLICATIONS

The present application is a continuation of U.S. application Ser. No. 15/973,443 filed May 7, 2018, which is a continuation of U.S. application Ser. No. 15/280,979, now U.S. Pat. No. 9,967,689, filed Sep. 29, 2016, the disclosures of which are explicitly incorporated by reference herein in their entirety. The present application also incorporates by reference U.S. patent application Ser. No. 13/239,077, now U.S. Pat. No. 9,286,384, filed on Sep. 21, 2011, for "Methods and Systems to Share Media" and U.S. patent application Ser. No. 14/971,796, now U.S. Pat. No. 10,098,082, filed on Dec. 16, 2015, for "Synchronization of Content Between Networked Devices."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 shows example audio characteristics of audio content and corresponding playback device capabilities;

FIG. 8 shows example audio characteristics of audio content and corresponding playback device capabilities.

Figure 1:
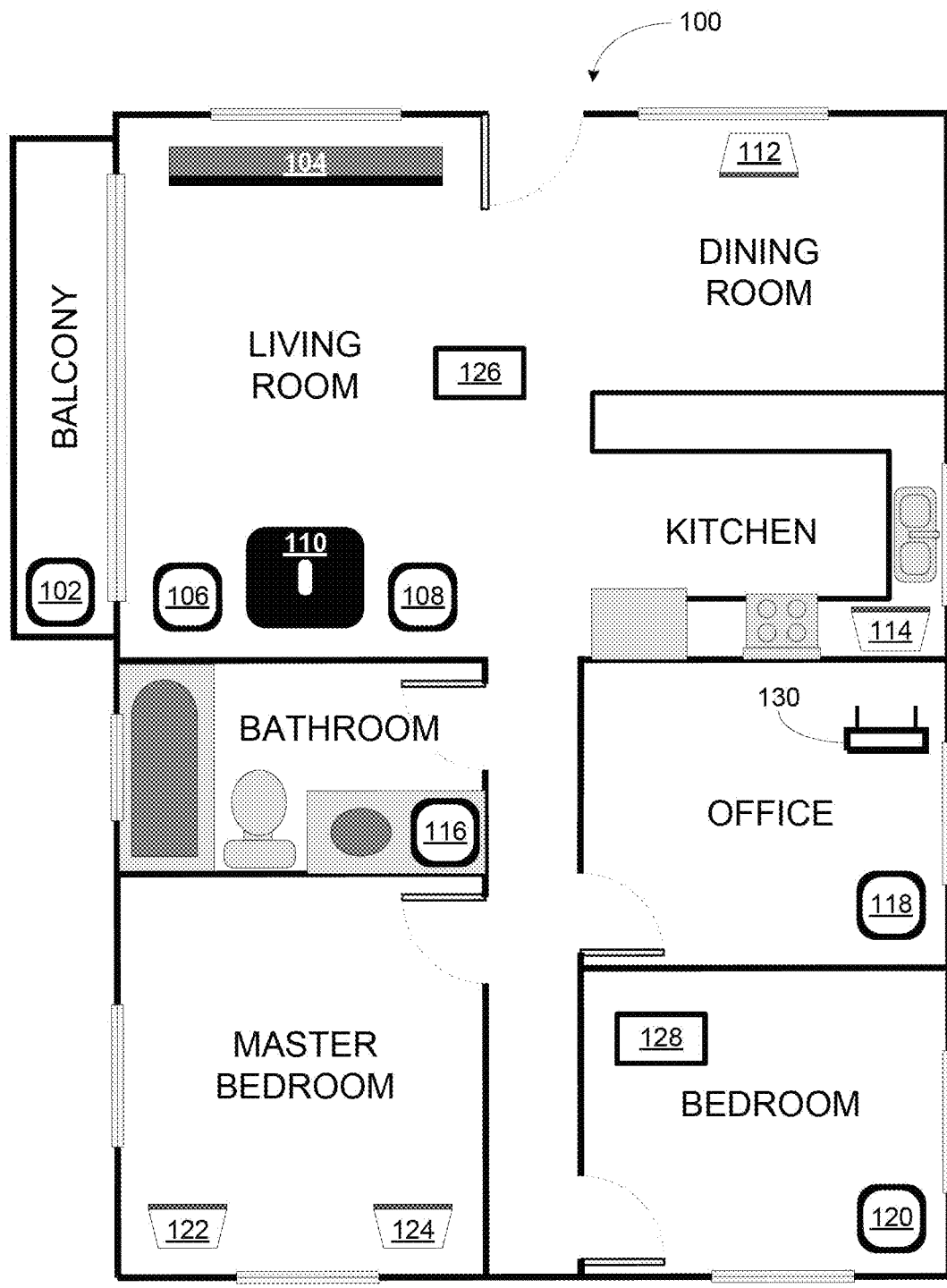
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples described herein involve the conditional enhancement of audio content based on the capability of one or more playback devices that may play back the audio content. For instance, a playback device may determine that playback of a first version of audio content may be improved by retrieving a second version of the same audio content having audio characteristics that more closely match the capability of the playback device.

For example, a playback device within a media playback system may have access to numerous content sources, such as audio and video streaming services, content libraries, and local device storage, among other examples. Many of the sources available to the playback device may contain versions of the same audio content, such as a particular song by a particular artist, or an audio track that accompanies a particular movie. However, the audio characteristics of each version of the same audio content may not be the same. For example, a first version of the audio content, available from a first source, may have a first bit depth, sample rate and/or number of audio output channels, whereas a second version of the same audio content, available from a second source, may have second bit depth, sample rate, and/or number of audio output channels.

Accordingly, when the playback device identifies a first version of audio content that is to be played back, the playback device may determine whether the audio content can be enhanced by identifying and retrieving an improved version of the audio content. For instance, the playback device may identify the value of one or more audio characteristics of the first version of the audio content, such as the audio characteristics discussed above. The playback device may then determine that the value of the audio characteristic does not match the capability of the playback device. In other words, the playback device may determine that it, either alone or in combination with other playback devices in the media playback system, has the capability to play back an improved version of the audio content.

The playback device may then identify, by searching available content sources, a second version of the audio content that has an improved value for the audio characteristic that more closely matches the capability of the playback device. The playback device may then cause the second version of the audio content to be played back, improving the listening experience within the media playback system 100.

As indicated above, the examples involve the conditional enhancement of audio content. In one aspect, a method is provided. The method involves identifying, by a playback device, a first version of audio content for play back from a first source and identifying, by the playback device, a first value of an audio characteristic of the first version of the audio content, where the playback device includes a capability corresponding to the audio characteristic. The method also includes determining, by the playback device, that the first value of the audio characteristic of the first version of the audio content does not match the capability of the playback device. The method further includes identifying, by the playback device, a second version of the audio content from a second source, where the second version of the audio content includes the audio characteristic having a second value, and where the second value of the audio characteristic is closer to the capability of the playback device. The method also involves causing playback of the second version of the audio content.

In another aspect, a device is provided. The device includes a processor, a non-transitory computer readable medium, and program instructions stored on the non-transitory computer readable medium that, when executed by the processor, cause the playback device to perform functions including identifying a first version of audio content for play back from a first source, and identifying a first value of an audio characteristic of the first version of the audio content, where the playback device includes a capability corresponding to the audio characteristic. The functions also include determining that the first value of the audio characteristic of the first version of the audio content does not match the capability of the playback device. The functions further include identifying a second version of the audio content from a second source, where the second version of the audio content includes the audio characteristic having a second value, and where the second value of the audio characteristic is closer to the capability of the playback device. The functions also include causing playback of the second version of the audio content.

In yet another aspect, a non-transitory computer readable memory is provided. The non-transitory computer readable memory has stored thereon instructions executable by a playback device to cause the playback device to perform functions. The functions include identifying a first version of audio content for play back from a first source and identifying a first value of an audio characteristic of the first version of the audio content, where the playback device includes a capability corresponding to the audio characteristic. The functions also include determining that the first value of the audio characteristic of the first version of the audio content does not match the capability of the playback device. The functions further include identifying a second version of the audio content from a second source, where the second version of the audio content includes the audio characteristic having a second value, and where the second value of the audio characteristic is closer to the capability of the playback device. The functions also include causing playback of the second version of the audio content.

It will be understood by one of ordinary skill in the art that this disclosure includes numerous other embodiments. It will be understood by one of ordinary skill in the art that this disclosure includes numerous other examples. While some examples described herein may refer to functions performed by given actors such as "users" and/or other entities, it should be understood that this description is for purposes of explanation only. The claims should not be interpreted to require action by any such example actor unless explicitly required by the language of the claims themselves.

While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
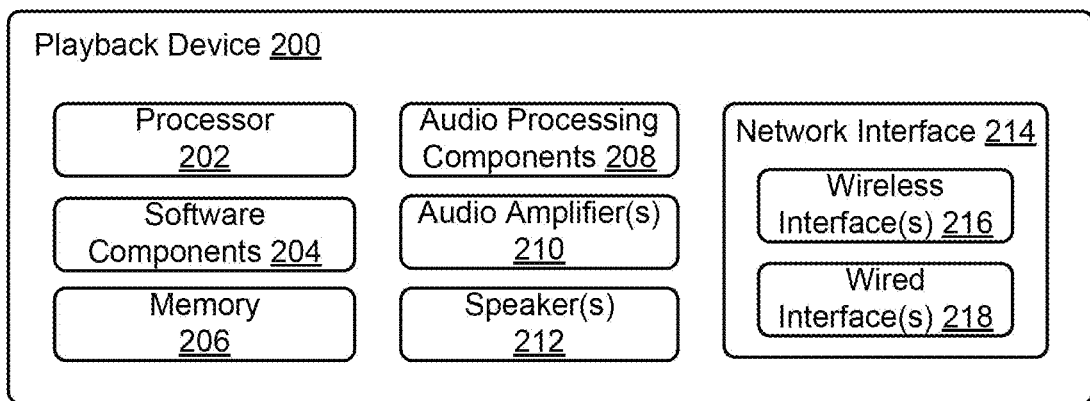
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
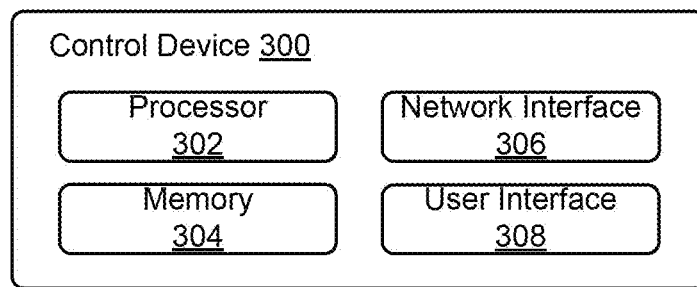
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
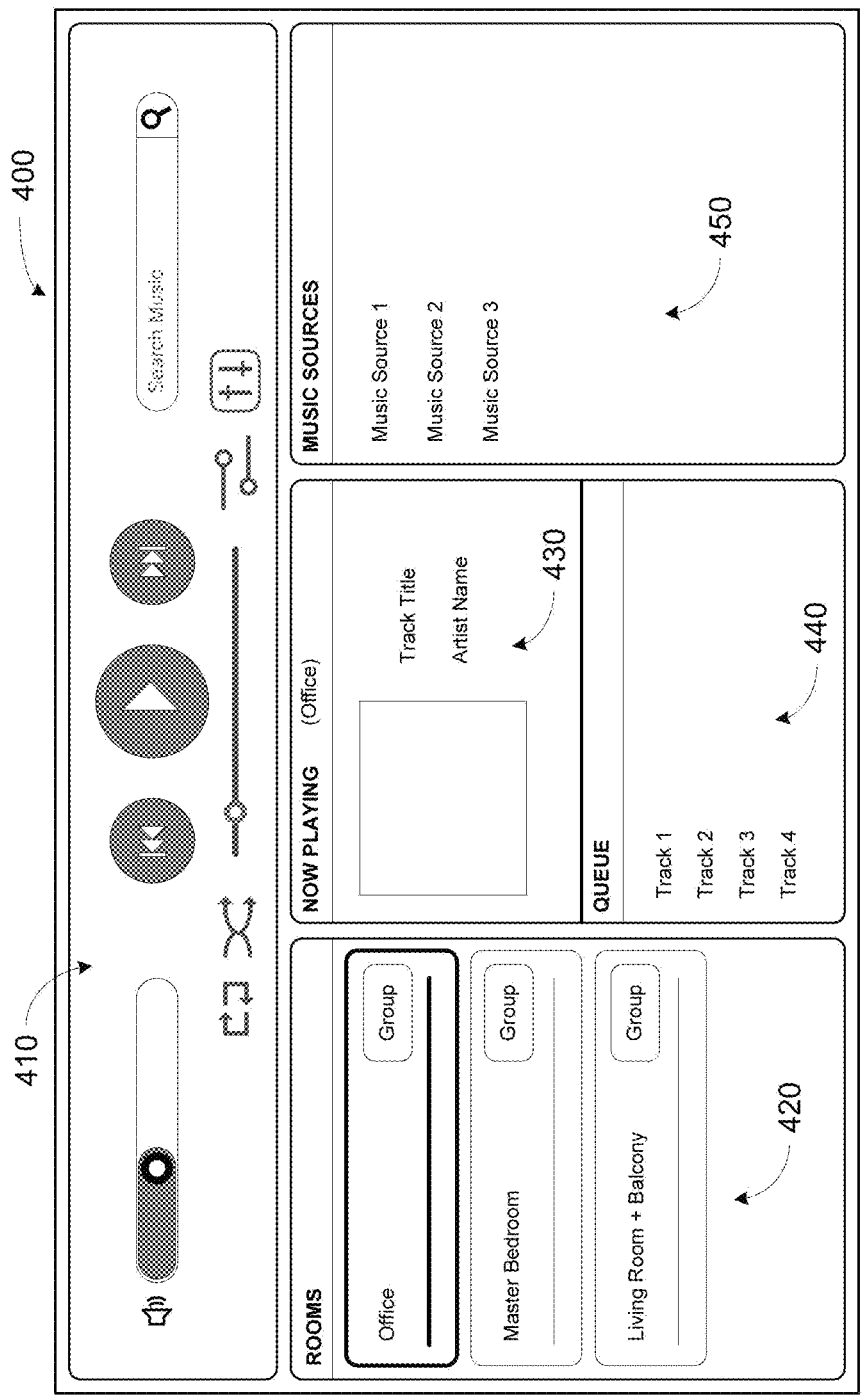
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Implementations of Conditional Content Enhancement

As discussed above, embodiments described herein may involve the conditional enhancement of audio content based on the capability of one or more playback devices that may play back the audio content.

Figure 5:
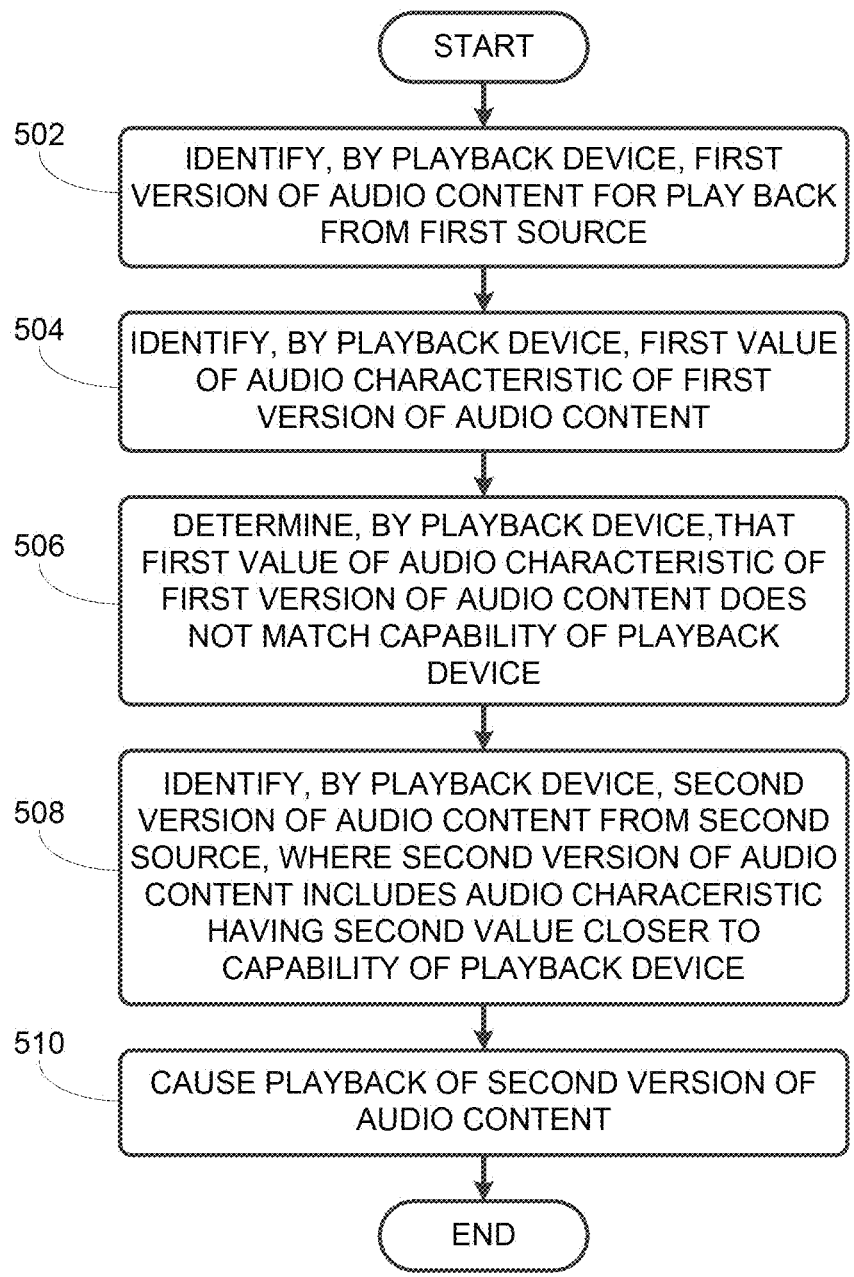
FIG. 5 shows an example flow diagram for the conditional enhancement of audio content.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Figure 6:
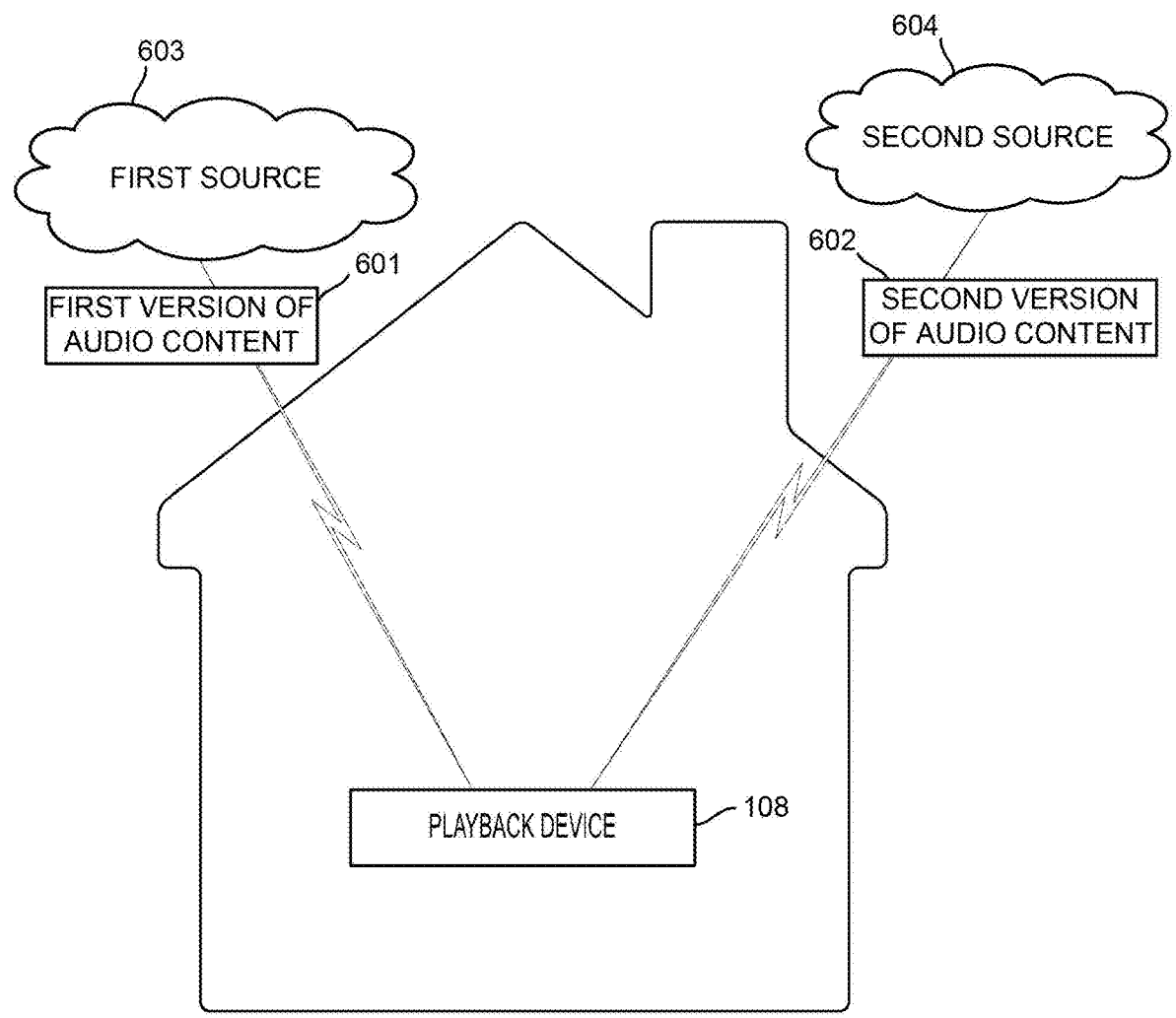
FIG. 6 shows an example playback device and example audio content sources.

At block 502 of the method 500, a playback device may identify a first version of audio content for play back from a first source. The playback device may be, for example, the playback device 200 shown in FIG. 2, and may further correspond to one of the playback devices 102-124 in the media playback system 100 shown in FIG. 1. FIG. 6 illustrates an example implementation. The playback device 108 of FIG. 1 is shown, which identifies the first version of audio content 601 from the first source 603.

The first version of the audio content 601 may be any audio content that may be played back by the playback device 200, and the first source 603 may be any source that can provide content to the playback device 200, such as those discussed in section II.d. above. For instance, the first version of the audio content 601 may be a music track. The first version of the audio content 601 might take other forms as well, such as an audiobook or a podcast, among other examples. Further, although it is illustrated as a cloud-based source in FIG. 6, such as an internet-based streaming music provider, the first source 603 may alternatively be a local network connected device, or a control device such as the control device 300, among other examples.

In further examples, the first version of the audio content 601 may be audio content that accompanies video content. For instance, the media playback system 100 and the playback device 108 may be integrated with a home theater system, and the first version of the audio content 601 may be the audio corresponding to a movie, television show, music video or other video content on a television. Similarly, a control device, such as the control device 300, may include a display capable of playing back video content in synchrony with audio content via the playback device 108. In such cases, the first version of the audio content 601 may be received from the same source that originates the video content. For example, the first source 603 may be a locally-connected device such as a cable box, a satellite tuner, a DVD or Blu-ray player. Alternatively, the first source 603 for the first version of the audio content 601 may be an internet-based video streaming service that also transmits audio corresponding to the video stream. Numerous other possibilities exist.

The playback device 108 may identify the first version of the audio content in a number of ways. For instance, the playback device 108 may receive a URI or a URL to the first version of the audio content 601 as part of a command to play the audio content from the first source 603. In other implementations, where the first version of the audio content 601 is pushed to the playback device 108, the playback device 108 may identify the first version of the audio content 601 based on metadata that is received in addition to the first version of the audio content 601. In other examples, such as an example where metadata identifying the first version of the audio content 601 is not available, the playback device 108 may sample the first version of the audio content 601 and identify it based on an audio recognition algorithm. Other examples are also possible.

At block 504, the playback device 108 may identify a first value of an audio characteristic of the first version of the audio content 601, wherein the playback device 108 comprises a capability corresponding to the audio characteristic. The audio characteristic of the first version of the audio content 601 may be any audio characteristic that affects the playback of the audio content. For instance, FIG. 7 shows a representation of the audio content 601, including a list of audio characteristics such as bit depth 701a, sample rate 701b, and number of channels 701c. For the bit depth 701a, the playback device 108 identifies a first value of 8-bit 702a, also shown in FIG. 7. Similarly, the playback device 108 identifies a first value of 32 kHz 702b for the sample rate 702a, and a first value of 1 (mono) 702c for the number of channels 701c.

The playback device 108 may identify a value for other audio characteristics as well, in addition to those discussed above and shown in FIG. 7. For instance, the playback device 108 may identify the audio format, which may indicate the audio codec used to compress and decompress the first version of the audio content 601, such as MP3, AAC, or FLAC, among other possibilities. As another example, some audio content may be object-based rather than channel-based, and the playback device 108 may identify values for object-based audio characteristics, such as polar resolution, or polar coordinates. Other possibilities also exist.

In some cases, the first version of the audio content 601 may include metadata that the playback device 108 may use to identify the first value of the audio characteristic. However, in some examples the metadata may be unavailable or incomplete. In these instances, the playback device 108 may, before identifying the first value of the audio characteristic, play back the first version of the audio content 601. Based on the sample of playback of the first version of the audio content 601, the playback device 108 may identify the first value of the audio characteristic.

In other implementations, such as those where the first version of the audio content 601 is streamed from an internet-based source, the first value of the audio characteristic may change during the stream. For instance, the bit depth or sample rate of an incoming audio stream may be reduced due to network latency or bandwidth considerations. Therefore, the playback device 108 may identify the first value for the audio characteristic at regular or irregular intervals during playback of the first version of the audio content 601. Additionally or alternatively, the playback device 108 may identify the first value for the audio characteristic whenever a change in the incoming audio stream is detected.

Additionally, the playback device 108 includes a capability corresponding to the audio characteristic. For example, FIG. 7 illustrates a representation of the playback device 108, including a list the same audio characteristics 701a-c that are listed for the first version of the audio content 601. For each audio characteristic 701a-c, the capability of the playback device 108 is listed. For instance, for bit depth 701a, the capability of the playback device 108 is 16 bit 703a. Similarly, for sample rate 701b, the capability of the playback device 108 is 44.1 kHz 703b, and for number of channels, the capability is 1 (mono) 703c. In each instance, the listed capability of the playback device 108 may generally correspond to the highest quality audio that the playback device 108 can play. For instance, a higher bit depth or sample rate may generally correspond to better quality audio and an improved listening experience. Similarly, some audio codecs utilize compression that results in data loss and degradation of the audio content, whereas other file formats result in less data loss, utilize lossless compression, or are uncompressed. Thus, the capability of the playback device 108 with respect to audio format may correspond to the audio format(s) that result in the least data loss.

At block 506, the playback device 108 may determine that the first value of the audio characteristic of the first version of the audio content 601 does not match the capability of the playback device 108. For instance, as shown in FIG. 7, the playback device 108 may determine that the bit depth 701a of the first version of the audio content 601, namely, 8 bit 702a, does not match the capability, 16 bit 703a, of the playback device 108. The playback device may make a similar determination regarding the sample rate 701b, as 32 kHz 702b is also below the 44.1 kHz 703b capability.

At block 508, the playback device 108 may identify a second version of the audio content from a second source. FIG. 6 illustrates the playback device 108, which identifies the second version of the audio content 602 from the second source 604. Like the first source 603, the second source 604 may be any of the audio content sources discussed above in section II.d. For example, the first version of the audio content 601 may be a particular song by a particular artist, and the first source 603 may be a control device 300 in the media playback system 100 that includes the first version of the audio content 601 stored in its memory 304. The second version of the audio content 602 is a second version of the same song, by the same artist, but the source 604 may instead be an internet-based music streaming service or content library.

Although the first and second versions of the audio content are the same song, by the same artist, the audio characteristics of the two versions in this example are different. In particular, the second version of the audio content 602 includes the audio characteristic having a second value, and the second value of the audio characteristic is closer to the capability of the playback device 108. The example shown in FIG. 7 is illustrative. As noted above, the capability of the playback device 108 with respect to both bit depth 701a and sample rate 701b exceeds the values of those two audio characteristics for the first version of the audio content 601. However, the playback device 108 identifies a second version of the audio content 602 that, although it is the same song by the same artist, has a bit depth 701a with a second value of 16 bit 704a, and a sample rate 701b with a second value of 44.1 kHz 704b. Thus, the playback device 108 has identified a higher-quality version of the same audio content, the playback of which may enhance the listening experience.

Accordingly, at block 510, the playback device 108 may cause playback of the second version of the audio content 602. In some examples, before causing playback of the second version of the audio content 602, the playback device 108 may synchronize playback of the second version of the audio content 602 with playback of the first version of the audio content 601. For instance, the playback device may align the start and end times of the two versions of the audio content and then match a presentation time stamp for upcoming samples that are to be played. This may allow for the second version of the audio content 602 to be played at the same time or nearly the same time that the first version of the audio content 601 was to be played, which may be important where the audio content is synced with video content.

Further, in some instances where the second version of the audio content 602 is identified after the first version of the audio content 601 is already being played back, the playback device 108 may perform additional processing, such as cross-fading the volume between the two versions, in order to provide a smooth transition between the playback of the content. Other possibilities for synchronizing the playback of the first and second versions of the audio content 601, 602 are also possible.

Numerous other examples exist where the playback device 108 may identify multiple version of the same audio content, where the versions have different audio characteristics. For instance, FIG. 8 illustrates another example in which the first version of the audio content 801 is spatialized for only 1 (mono) channel 802*c* of audio output. On the other hand, the playback device 108, which in isolation might be capable of only single channel playback, may be grouped with playback device 106 for synchronous playback of audio content. Therefore, the capability of playback device 108 with respect to the number of channels 701*c* is 2 (stereo) 803*c*. Accordingly, the second version of the audio content 804 that is identified by the playback device 108 has a value of 2 (stereo) 805*c* for the number of channels 701*c*, which matches the capability of the playback device 108.

In some implementations, the playback device 108 may determine an update to the capability of the playback device 108, and then determine that the first value of the audio characteristic of the first version of the audio content 601 does not match the updated capability of the playback device 108. For example, the playback device 108 may determine that a second playback device in the media playback system 100 has been grouped with the playback device 108 for synchronous playback. For instance, the playback device 108 may be grouped with the playback device 106, as shown in FIG. 1, for stereo playback. Accordingly, the number of channels that the playback device 108 is capable of playing in its updated configuration may be 2 (stereo). Thus, the playback device 108 would determine that the number of channels 701*c* of the first version of the audio content 601 does not match the updated capability of the playback device 108.

As another example, the capability of the playback device 108 may change if the playback device 108 receives a software update that increases the bit depth or sample rate that it is capable of playing, or that updates the file formats it is able to play.

Similar examples exist with respect to audio that is played in synchrony with video. For instance, the playback device 108 may receive a first version of audio content corresponding to a television program via a first source, such as a satellite tuner. The first version of the audio content may include two channels of audio playback. However, the playback device 108 may be grouped with other playback devices in the media playback system 100 and as a result, be capable of playing back 5.1 channel audio content. The playback device 108 may then identify a second version of the same television program from a second source, such as an internet-based video service provider, that includes an audio stream spatialized for 5.1 channel audio output. The playback device may then retrieve and synchronize the second version of the audio content with the video stream, and play back the second version of the audio content. Additional examples of synchronization of audio and video content are described in U.S. patent application Ser. No. 14/971,796, which is incorporated by reference.

In some examples, before identifying the second version of the audio content 602 from the second source, the playback device 108 may determine a likelihood that an improved version of the audio content 601 exists and is retrievable. For example, the playback device 108 may identify the first source 603 of the first version of the audio content 601 as a line-in input from a microphone. This may correspond to audio content that is being generated live, and for which a second version of the same audio content is unlikely to exist. Therefore, the playback device 108 may not attempt to identify a second version of the audio content.

Conversely, the first version of the audio content 601 may be identified as a music track having a URI at the first content source 603, such as a streaming music service. Based on this identification, the playback device 108 may determine that it is likely that a second version of the same music track may exist elsewhere at a second content source 604, and therefore the playback device 108 may undertake to identify a second version of the audio content 602 with improved audio characteristic having the second value.

In some cases, identifying the second version of the audio content 602 from the second source 604 may include the playback device 108 searching available sources for the second version of the audio content 602 having the second value. The search may include one or more queries, such as a search a based on a universal content identifier, such as UUID, or a search of available sources for metadata identifying the audio content in question having the desired audio characteristic values. The playback device 108 may also sample and fingerprint versions of the audio content from different sources, in order to determine the values of the audio characteristics in those versions. Additional methods of searching for and identifying audio content are discussed in U.S. Pat. No. 9,286,384, which is incorporated by reference.

Additionally or alternatively, the playback device may identify a second version of the audio content 602 having values for the audio characteristics that more closely match the capabilities of the playback device 108, but which is available from a second source 604 to which the playback device 108 does not have access. In this situation, the playback device 108 may cause a message to be sent to a control device of the media playback system 100, such as the control device 300, suggesting that a higher-quality version of the desired audio content is available from the second source 604.

Other similar messages or indications may be generated in conjunction with the operations of the method 500. These messages or indications may be displayed on a control device 300 in the media playback system 100. For example, after identifying and playing back the second version of the audio content 602, the playback device 108 may cause an indication that better quality audio content was retrieved and is now being played. Additionally or alternatively, the first playback device 108 may transmit a message to the first source 603 indicting that the first playback device 108 is retrieving a higher quality version of the audio content from a different source. Other possibilities also exist.

In some cases, causing playback of the second version of the audio content 602 may include causing playback by a second playback device in the media playback system 100. For example, the first version of the audio content 801 shown in FIG. 8 is spatialized for 1 (mono) channel of audio output. However, the playback device 108 in the example of FIG. 8 is grouped with playback device 106, and therefore capable of 2 (stereo) channel audio output. Accordingly, the playback device 108 may identify the second version of the audio content 804 spatialized for 2 (stereo) channel audio output, and cause playback of the second version of the audio content 804 on both the playback device 108 and the second playback device 106.

In another implementation, the playback device 108 may be grouped with other playback devices for synchronous playback, where a second playback device in the group, such as the playback device 104, has different capabilities than the playback device 108. For example, the playback device 104 may be a newer model device that is capable of playing audio content with a greater bit depth or a higher sample rate, or perhaps a wider range of audio formats than the playback device 108. In these situations, the playback device 108 may determine that the value of the audio characteristic of the first version of the audio content 601 does not match the capability of the second playback device 104, and then identify a second version of the audio content 602 to match the capability of the second playback device 104. The playback device 104 may then play the second version of the audio content 602 in synchrony with the playback of the first version of the audio content 601 by the playback device 108.

Extending this example, the playback device 108 might also identify a third version of the audio content. The third version of the audio content may have audio characteristics with values that match the capability of the playback device 108, and are of higher quality than the first version of the audio content 601, yet are of lower quality than the second version of the audio content 602 that was identified for the playback device 104. Thus, the playback device 108 may enhance the playback of audio content by identifying, for each playback device in the group, the highest quality version of the audio content that that playback device is capable of playing, and then coordinating the synchronous playback of all versions of the audio content.

Alternatively, the playback device 108 may identify a second version of the audio content 602 that exceeds the audio quality that the playback device 108 is capable of playing, as shown in FIG. 6. For example, the playback device 108 may identify a second version the audio content that includes a bit depth of 24 bit and a sample rate of 48 kHz. Additionally, the playback device 108 may identify a second playback device within the media playback system 100, such as the playback device 112, that has capabilities that meet or exceed these values. The playback device 108 may cause an indication to be displayed on a control device 300 that a higher quality version the audio content has been identified and can be played back on the playback device 112. The control device 300 may present an option to begin playback of the second version of the audio content 602, and to optionally form a group for synchronous playback with the playback device 108.

Similarly, the playback device 108 may identify a second version of the audio content that exceeds the audio quality of all of the playback devices in the media playback system. In this situation, the playback device 108 may present an indication, via a control device 300, suggesting to a user that playback devices capable of playing back higher quality audio content are available for purchase.

Although the examples described thus far have involved the enhancement of audio content by identifying a second version of the audio content having a higher bit depth, sample rate, or number of audio channels, it is important to note that the playback of audio content might alternatively be improved by reducing the value of these audio characteristics. In other words, an enhanced listening experience may not always involve "better" audio content. For example, the capability of the playback device 108 may be reduced in some situations, such as when there is a change in the network bandwidth associated with the playback device 108, or if a second playback device that is grouped with the playback device 108 fails or is ungrouped. In these instances, the first version of the audio content 601 may have a sample rate that is too high for the updated network bandwidth, which may lead to undesirable dropouts or pauses during playback of the audio content. Similarly, the first version the audio content 601 may be spatialized for 2-channel stereo output when the playback device 108 is grouped with the playback device 106. However, if the playback device 106 is regrouped into a different configuration, the playback device 108 is only capable of 1-channel mono playback. This in turn may lead to the undesirable playback of only 1 of the 2 channels of audio output in the first version of the audio content 601.

In these situations, the playback of audio content by the playback device 108 may actually be enhanced by identifying and playing back a second version of the audio content 602 having audio characteristics of a lower quality, such as a lower sample rate or bit depth, a lesser number of audio output channels, or a file format that is more compressed and includes more data loss.

For many of the same reasons, the playback device 108 may assess network conditions before identifying and playing back a second version of the audio content 602 that corresponds to a higher nominal capability of the playback device 108. This may reduce the likelihood of a situation where the actual capability of the playback device 108, as limited by network conditions, is exceeded.

In some examples, the playback device 108 may prioritize multiple available versions of the audio content based on an extent to which each audio characteristics may affect playback quality. For instance, using the previous example, the playback device 108 may experience a drop in network bandwidth, and as a result may attempt to identify a second version of the audio content 602 that is of lower quality. In doing so, the playback device 108 may first query available content sources for a version of the audio content having a lower sample rate. If a version having a reduced sample rate cannot be found, or if a version having the recued sample rate is not sufficient to compensate for the decreased bandwidth, the playback device may search for a version of the audio content additionally or alternatively having a reduced bit depth. Reducing the value of these audio characteristics may be prioritized over reducing the number of audio channels, because the effect of reducing the sample rate or bit depth may be less noticeable to the overall audio quality than a reduction in the number of audio channels.

In a similar manner, the playback device 108 may also prioritize available versions of the audio content in situations where the audio quality is improved. For instance, the playback device 108 may prioritize an increase in the number of audio channels to match the capability of the playback device 108 over changes in the bit depth of sample rate. FIG. 8 illustrates such an example, where the first version of the audio content includes a bit depth 701a of 16 bit 802a, a sample rate 701b of 44.1 kHz 802b, and a number of channels 701c of 1 (mono) 802c. Meanwhile, the playback device 108, which is grouped with playback device 106 in this example, has the capability of playing 16 bit 803a, 44.1 kHz 803b audio content having 2 (stereo) channel audio output. As shown in FIG. 8, the playback device 108 identified the second version of the audio content 804 having an improved number of audio channels, 2 (stereo) 805c, to match the capability of the playback device 108. However, the second version of the audio content 804 has a reduced sample rate of 32 kHz 805b. In this case, the playback device 108 has prioritized the number of audio channels over the sample rate. In other examples, the values of the audio characteristics such as sample rate and/or bit depth may have minimum thresholds below which an improved number of audio channels would no longer be prioritized. Other possibilities also exist.

Finally, although the examples above discuss the playback device 108 performing the operations associated with the method 500, it is also possible that a computing device that is separate from the playback device 108 may carry out these actions. For example, a control device, such as the control device 300, or a remote server may determine the capabilities of the playback device 108 and other playback devices in the media playback system 100, as discussed above. The computing device may then identify and retrieve an appropriate version of the audio content from an appropriate source, and send it to the playback device 108 for playback. Further, a combination of computing devices, including the playback device 108, may perform the operations in combination.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples involve the conditional enhancement of audio content. In one aspect, a method is provided. The method involves identifying, by a playback device, a first version of audio content for play back from a first source and identifying, by the playback device, a first value of an audio characteristic of the first version of the audio content, where the playback device includes a capability corresponding to the audio characteristic. The method also includes determining, by the playback device, that the first value of the audio characteristic of the first version of the audio content does not match the capability of the playback device. The method further includes identifying, by the playback device, a second version of the audio content from a second source, where the second version of the audio content includes the audio characteristic having a second value, and where the second value of the audio characteristic is closer to the capability of the playback device. The method also involves causing playback of the second version of the audio content.

In another aspect, a device is provided. The device includes a processor, a non-transitory computer readable medium, and program instructions stored on the non-transitory computer readable medium that, when executed by the processor, cause the playback device to perform functions including identifying a first version of audio content for play back from a first source, and identifying a first value of an audio characteristic of the first version of the audio content, where the playback device includes a capability corresponding to the audio characteristic. The functions also include determining that the first value of the audio characteristic of the first version of the audio content does not match the capability of the playback device. The functions further include identifying a second version of the audio content from a second source, where the second version of the audio content includes the audio characteristic having a second value, and where the second value of the audio characteristic is closer to the capability of the playback device. The functions also include causing playback of the second version of the audio content.

In yet another aspect, a non-transitory computer readable memory is provided. The non-transitory computer readable memory has stored thereon instructions executable by a playback device to cause the playback device to perform functions. The functions include identifying a first version of audio content for play back from a first source and identifying a first value of an audio characteristic of the first version of the audio content, where the playback device includes a capability corresponding to the audio characteristic. The functions also include determining that the first value of the audio characteristic of the first version of the audio content does not match the capability of the playback device. The functions further include identifying a second version of the audio content from a second source, where the second version of the audio content includes the audio characteristic having a second value, and where the second value of the audio characteristic is closer to the capability of the playback device. The functions also include causing playback of the second version of the audio content.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A computer system comprising:
   at least one processor;
   at least one non-transitory computer readable medium; and
   program instructions stored on the at least one non-transitory computer readable medium that, when executed by the at least one processor, cause the computer system to perform functions comprising:

identifying a capability of a playback device to reproduce audio content;
based on the capability of the playback device to reproduce audio content, identifying a first version of audio content from a first cloud-based media service for playback by the playback device;
causing the playback device to receive and play back the first version of audio content;
while the playback device is playing back the first version of the audio content, detecting a change in a network connection between the computer system and the playback device;
based on (i) the detected change in the network connection between the computer system and the playback device and cii) the capability of the playback device to reproduce audio content, identifying a second version of audio content from a second cloud-based media service for playback by the playback device; and
causing the playback device to transition from receiving and playing back the first version of the audio content to receiving and playing back the second version of the audio content.

2. The computer system of claim 1, wherein the capability of the playback device to reproduce audio content comprises at least one of: a supported sampling rate; a supported bit depth;
and a supported number of audio channels.

3. The computer system of claim 1, wherein detecting the change in the network connection between the computer system and the playback device comprises detecting at least one of: a change in network latency and a change in network bandwidth.

4. The computer system of claim 1, wherein detecting the change in the network connection between the computer system and the playback device comprises detecting a reduction in network bandwidth and wherein identifying the second version of the audio content from the second cloud-based media service for playback by the playback device comprises:
identifying a lower quality version of the audio content relative to the first version of the audio content.

5. The computer system of claim 4, wherein the lower quality version of the audio content has a lower value for at least one of: a sampling rate, a bit depth, and a number of audio channels relative to the first version of the audio content.

6. The computer system of claim 4, wherein the first version of the audio content is encoded in a first format and wherein the lower quality version of the audio content is encoded in a second format that compresses the audio content more than the first format.

7. The computer system of claim 1, wherein detecting the change in the network connection between the computer system and the playback device comprises detecting an increase in network bandwidth and wherein identifying the second version of the audio content from the second cloud-based media service for playback by the playback device comprises:
identifying a higher quality version of the audio content relative to the first version of the audio content.

8. The computer system of claim 7, wherein the higher quality version of the audio content has a higher value for at least one of: a sampling rate, a bit depth, and a number of audio channels relative to the first version of the audio content.

9. The computer system of claim 7, wherein the first version of the audio content is encoded in a first format and wherein the higher quality version of the audio content is encoded in a second format that compresses the audio content less than the first format.

10. A method performed by a computer system, the method comprising:
identifying a capability of a playback device to reproduce audio content;
based on the capability of the playback device to reproduce audio content, identifying a first version of audio content from a first cloud-based media service for playback by the playback device;
causing the playback device to receive and play back the first version of audio content;
while the playback device is playing back the first version of the audio content,
detecting a change in a network connection between the computer system and the playback device;
based on (i) the detected change in the network connection between the computer system and the playback device and (ii) the capability of the playback device to reproduce audio content, identifying a second version of audio content from a second cloud-based media service for playback by the playback device; and
causing the playback device to transition from receiving and playing back the first version of the audio content to receiving and playing back the second version of the audio content.

11. The method of claim 10, wherein the capability of the playback device to reproduce audio content comprises at least one of: a supported sampling rate; a supported bit depth; and a supported number of audio channels.

12. The method of claim 10, wherein detecting the change in the network connection between the computer system and the playback device comprises detecting at least one of: a change in network latency and a change in network bandwidth.

13. The method of claim 10, wherein detecting the change in the network connection between the computer system and the playback device comprises detecting a reduction in network bandwidth and wherein identifying the second version of the audio content from the second cloud-based media service for playback by the playback device comprises:
identifying a lower quality version of the audio content relative to the first version of the audio content.

14. The method of claim 13, wherein the lower quality version of the audio content has a lower value for at least one of: a sampling rate, a bit depth, and a number of audio channels relative to the first version of the audio content.

15. The method of claim 13, wherein the first version of the audio content is encoded in a first format and wherein the lower quality version of the audio content is encoded in a second format that compresses the audio content more than the first format.

16. The method of claim 10, wherein detecting the change in the network connection between the computer system and the playback device comprises detecting an increase in network bandwidth and wherein identifying the second version of the audio content from the second cloud-based media service for playback by the playback device comprises:
identifying a higher quality version of the audio content relative to the first version of the audio content.

17. The method of claim 16, wherein the higher quality version of the audio content has a higher value for at least one of: a sampling rate, a bit depth, and a number of audio channels relative to the first version of the audio content.

18. The method of claim 16, wherein the first version of the audio content is encoded in a first format and wherein the higher quality version of the audio content is encoded in a second format that compresses the audio content less than the first format.

19. At least one non-transitory computer readable medium, wherein the at least one non-transitory computer-readable medium is provisioned with program instructions that, when executed by at least one processor, cause a computer system to perform functions comprising:
identifying a capability of a playback device to reproduce audio content;
based on the capability of the playback device to reproduce audio content, identifying a first version of audio content from a first cloud-based media service for playback by the playback device;
causing the playback device to receive and play back the first version of audio content;
while the playback device is playing back the first version of the audio content,
detecting a change in a network connection between the computer system and the playback device;
based on (i) the detected change in the network connection between the computer system and the playback device and (ii) the capability of the playback device to reproduce audio content, identifying a second version of audio content from a second cloud-based media service for playback by the playback device; and
causing the playback device to transition from receiving and playing back the first version of the audio content to receiving and playing back the second version of the audio content.

20. The non-transitory computer readable medium of claim 19, wherein the capability of the playback device to reproduce audio content comprises at least one of: a supported sampling rate; a supported bit depth; and a supported number of audio channels.

* * * * *